Aug. 18, 1936.  W. MUIR ET AL  2,051,455
SELF WINDING CLOCK AND TIME SWITCH
Filed Sept. 23, 1932  3 Sheets-Sheet 1
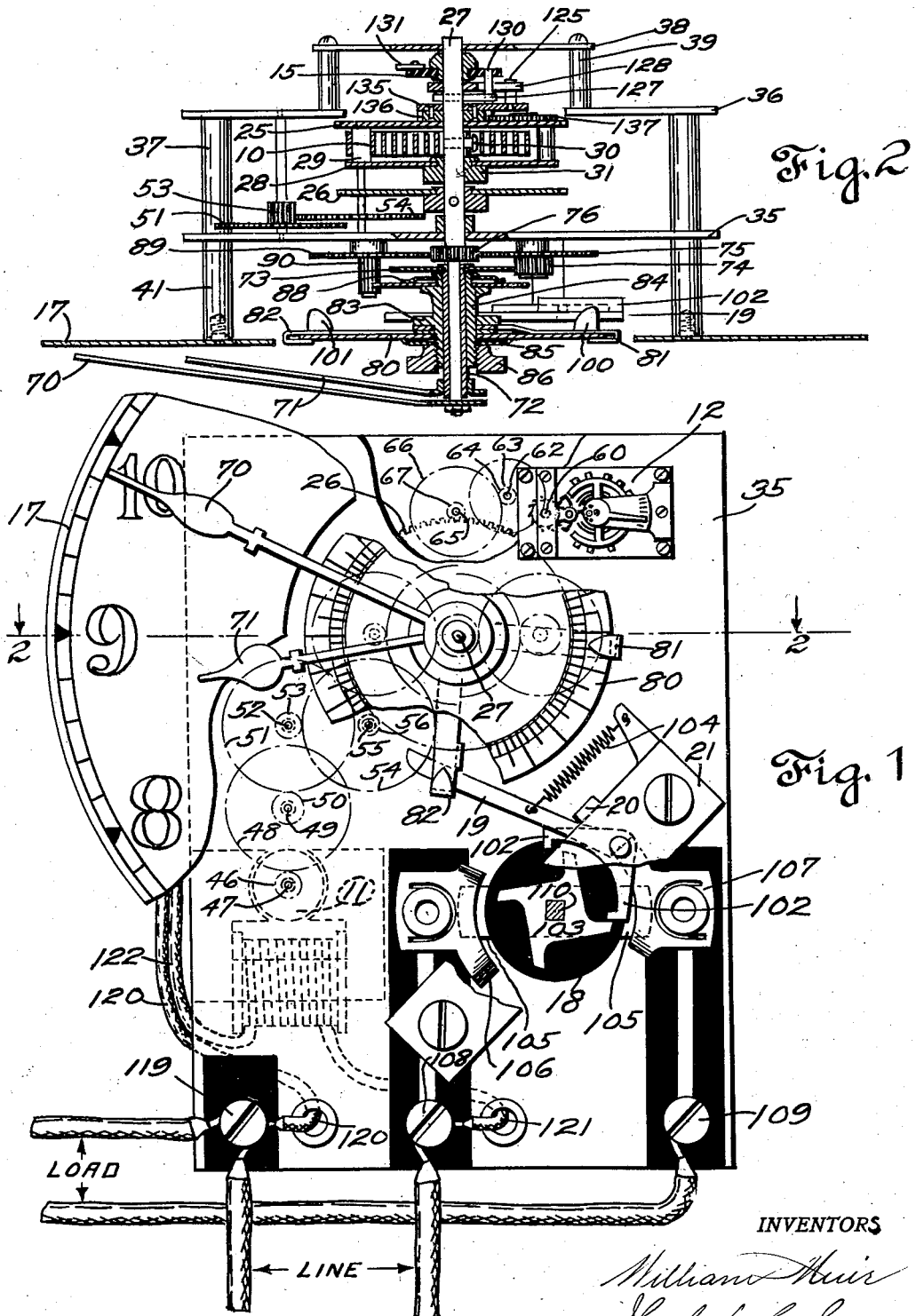
INVENTORS
William Muir
Herbert C. Snow INVENTORS
William Muir
Herbert C. Snow Aug. 18, 1936. W. MUIR ET AL 2,051,455
SELF WINDING CLOCK AND TIME SWITCH
Filed Sept. 23, 1932 3 Sheets-Sheet 3

INVENTORS
William Muir
Herbert C. Snow

Patented Aug. 18, 1936

2,051,455

UNITED STATES PATENT OFFICE 2,051,455

SELF-WINDING CLOCK AND TIME SWITCH

William Muir, Bristol, and Herbert C. Snow, Burlington, Conn., assignors to The H. C. Thompson Clock Co., Bristol, Conn., a corporation of Connecticut Application September 23, 1932, Serial No. 634,600

4 Claims. (Cl. 185—40)

This invention relates to improvements in spring motors adapted to be wound by another motor or motors, and particularly of the type suitable for use as the prime movers of time telling clocks, circuit controlling time switches, combinations thereof, and for analogous purposes.

Particularly, the present improvements concern spring motors which are wound by electric motors and more especially by electric motors having a rotary armature acting intermittently to perform the winding. The spring of such motors commonly acts as a reservoir of power derived from the intermittent brief fast running of the electric motor through a winding train and played out in the slow continuous running of a time train retarded by a time keeping escapement.

Self-winding movements acting broadly on the above principles are well known in the art and there is also well known the expedient resorted to for simplicity and compactness, of placing the slowest moving gear of the time train in concentric relation to the slowest moving gear of the winding train, to be supported, if desired, on the same spindle, and between which two gears may be located a spiral ribbon spring or band spring to serve as the power spring above referred to. Either end of such spring may be connected to be impelled by rotation of the winding gear and the other end connected to impel the time gear. Relative movement between the said two gears thereupon becomes necessary to effect a winding or an unwinding of the spring. Proper stop means definitely limit this relative movement to a preterminal extent which extent may exceed a full turn of relative movement of either gear. To control the periodicity and the duration of the intermittent winding action of such motors, it is common to provide electric contacts to be operated automatically at regular predetermined intervals by some moving part of the time train to start and stop the winding action of the electric motor, or which may be opened by the action of some moving part of the winding train to stop the winding.

Heretofore, in periodically acting, self-winding movements of this nature there has been provided an arrangement of such contacts and the associated elements which insures that during normal operation when once put into service by expert attention, a designed degree of running down or unwinding of the power spring shall cause the winding contacts to close and remain closed until the electric motor has run long enough on each such occasion to fully replenish the power which the spring has expended since the preceding automatic winding and without causing an overwinding, so that in the normal operation of the clock or time switch there shall be no aggregation nor depletion of winding in the spring above or below definite prescribed limits constituting the operating range. There has also been provided a degree of winding always existent in the spring below this designed operating range and placed there by an initial winding operation when the clock is placed in service by the attendant making the installation. This amount of "initial" winding plus any unexpired portion of the normal winding range constitutes at any given time the sum total of reserve power which the spring possesses and determines the length of time the movement would run before the spring power is entirely depleted should the electric motor fail to wind at its proper time due to run down batteries or other trouble.

There are certain short-comings in all movements of the above type with which we are familiar, which preclude their entrance to modern markets and uses which would benefit otherwise from the simplicity and compactness of this type of self winding movement. Among these shortcomings are the requirement for expert attention to the initial winding feature requiring a separate manual switch to be supplied for this purpose alone and a clear understanding of how to make use of this switch to avoid damage to the movement by attempted overwinding—the lack of a sufficient possibility of initial or accumulative winding to constitute a desirable amount of reserve in case of current failure and the former absence of any construction or manner of operation of the contacts acting automatically to start and stop the winding to make such contracts suitable to handle circuits exceeding battery voltages in the form of mechanism highly desirable for acting upon such contacts herein herein illustrated and lending itself to the simplicity and compactness which has formerly characterized the low voltage self-winding movements referred to.

Accordingly, it is an object of our invention to avail of the desirable features and proven advantages of the type of self-winding movements above described and to incorporate improvements which shall make them available to wider fields of use.

To this end our improvements aim to provide a self-winding movement which shall have in addition to its normal operating range of spring winding, a sub-range, or initial range, of winding accomplished by mechanical means of a character to make this sub-range or reserve-range practically unlimited by factors other than commercial desirability and which shall make this reserve range variable at will as to amount, by the simple change of the number of teeth in a gear.

Our improvements further aim to provide a winding control switch which shall end its movement in a contact making position whenever failure of current or failure of the electric motor to wind results in a running down of the movement spring below its normal operating stage of winding and into its reserve power stage of winding.

Our improvements further aim to provide a winding control switch so acting that if the spring runs down from its normal operating range of winding into its reserve power range of winding, the contacts will so act or successively act to restore the spring to its normal operating stage of winding and keep it there as a fully automatic operation independent of attention from the user.

Our improvements further aim to provide a winding control switch so automatically acting that when incorporated in a clock or time switch and shipped to the user direct or through the trade no expert services nor attention to printed directions shall be necessary to insure the correct installation and initiate the use of same in the hands of an uninformed purchaser.

Our improvements further aim to eliminate the manual pre-winding switch heretofore provided for operation by the user before service could be obtained from the self winding time switch or clock.

Our improvements further aim to provide a control switch of novel construction and characterized by a novel principle of operation to insure a snap action both to make and to break a circuit when used in whatever connection.

Our improvements further aim to provide a winding control switch actuated by relatively slow moving parts which shall constitute part of the means to limit movement between a winding and a spring driven element and which shall cause a snap action both to make and to break the circuit to a winding motor.

Our improvements further aim to provide in a mechanism of the hereinbefore recited character, novel principles of construction involving the introduction of friction slippage at points in the time train and winding train to permit of setting of the time telling hands by turning of the arbor on which the power spring is located and to permit adjustment in the tension of said spring while the parts mounted on said arbor are assembled in place.

These improvements further make possible a fully automatic time switch organization wherein a timing power spring and a switch actuating power spring are both automatically maintained wound by the same winding motor where each of said power springs are provided with over-wind and under-wind preventers eliminating all manual attention to their operation in practical use.

In the drawings:—

Fig. 1 is a front view of a combined time telling clock and time governed circuit controller embodying the present improvements, certain dial and indicating parts being broken away to better illustrate the mechanism.

Fig. 2 is a plan view looking downward on Fig. 1 certain parts being shown in section on the horizontal plane 2—2 of Fig 1.

Figure 4:
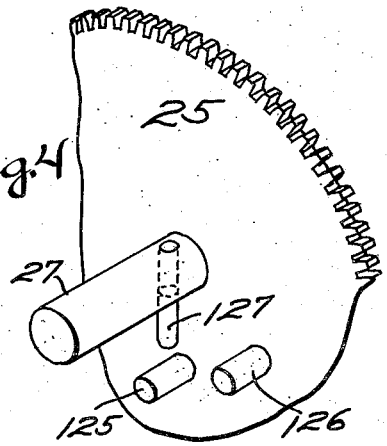
Fig. 4 is a fragmentary view of a possible arrangement of certain pins and stop parts associated with the spring winding gear of Fig. 2 with the epicyclic gears omitted. The parts are viewed as they would be seen in Fig. 3 and drawn on a larger scale.
Figure 6:
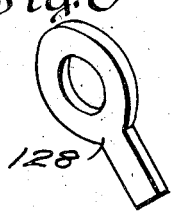
Figure 7:
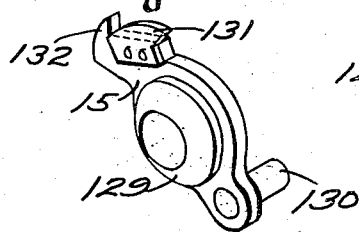
Figure 5:
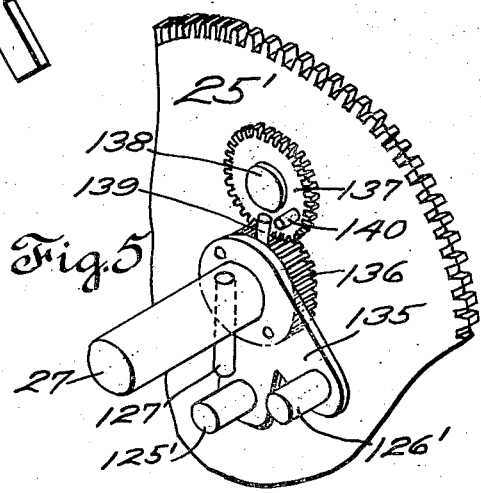
Fig. 5 is a view corresponding to Fig. 4 with the epicyclic gears included.

Fig. 6, on a correspondingly large scale, is a perspective view of the floating arm which is located between the parts shown in either Fig. 4 or 5 and the switch operating cam of Fig. 7.

Figure 3:
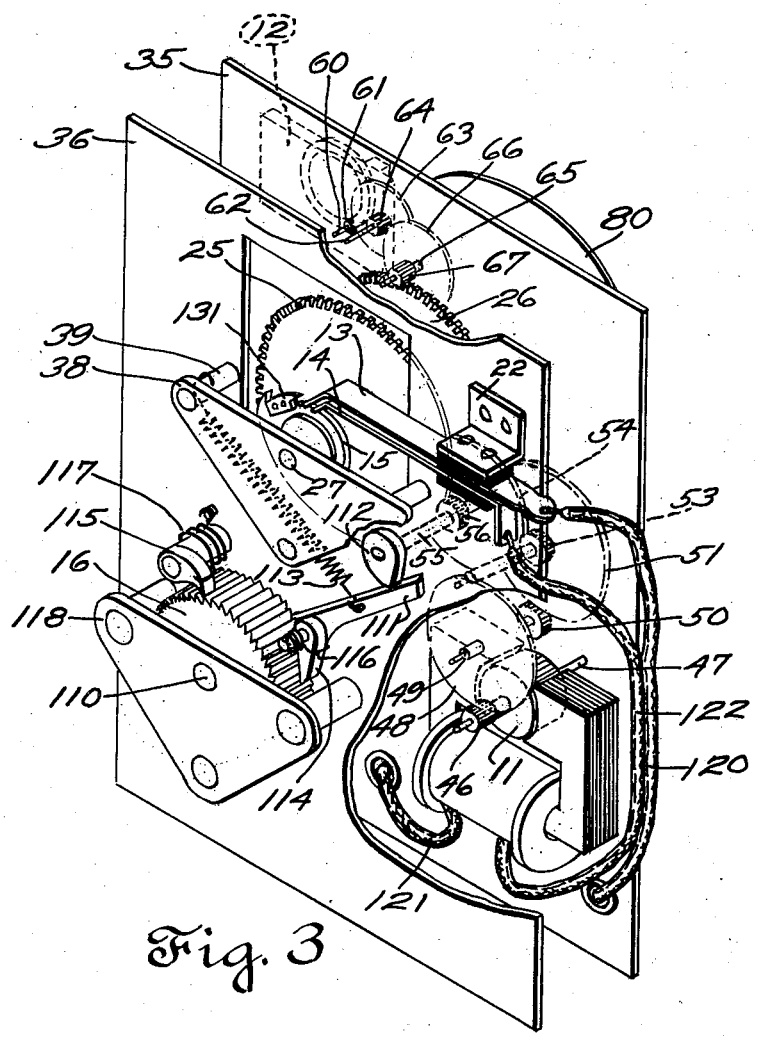
Fig. 3 is a perspective view looking from the rear at the complete device of Fig. 1, the clock face which surrounds the setting dial being omitted and certain parts broken away for clearness.

Fig. 7 is a correspondingly enlarged view of the switch operating cam as it partly appears in Fig. 3.

Figure 8:
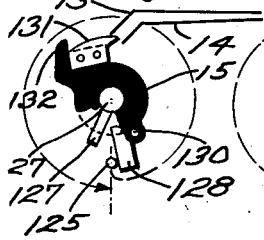

Fig. 8 shows diagramatically the switch cam, floating arm, and various stop pins of Figs. 4, 6 and 7 with one of the gear carried pins of Fig. 4 omitted for explaining certain advantages of these improvements, these parts together with the electrical, spring-leaf, contacts which they operate being positioned as they are left at the end of the automatic winding action.

Figure 9:
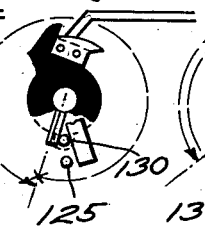

Fig. 9 shows the parts of Fig. 8 as they are positioned after one turn of running down action of the spring motor when automatic winding next begins.

Figure 10:

Fig. 10 shows the parts of Fig. 9 as they are positioned at the end of nearly two turns of running down action of the spring motor, should automatic winding by the electric motor fail to take place when the contacts are made as in Fig. 9.

Figure 11:
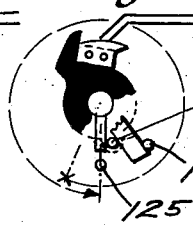

Fig. 11 illustrates the function of the second of the two pins carried by the winding gear of Fig. 4, in preventing a condition such as that shown in Fig. 10.

Figure 12:
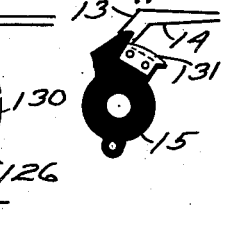

Fig. 12 shows an intermediate position of the parts of Figs. 8 to 11 inclusive wherein one spring-leaf contact is against the insulative portion and the other is against the conductive portion of the switch operating cam.

The complete clock and time switch organization comprises the following main parts. A power spring 10 to act as a reservoir of power furnished by the intermittent running of an electric motor 11 and to play out this power through the continuous running of a time train governed by a chronometer escapement represented as a unit by the ordinal 12 in Fig. 1;— a circuit controlling mechanism including the leaf contacts 13 and 14 and their operating cam 15 which, with associated parts, acts both electrically and mechanically to govern the time and extent of the winding action of motor 11 as well as to limit the unwinding action of spring 10;— a current switching mechanism 18 adapted to be automatically operated by a second power spring contained within the drum 16 of Fig. 3 which also acts as a reservoir for power stored therein by the intermittent running of motor 11;—and a suitable clock face 17 preferably with time telling hands and associated with adjustable time determining trip means 81—82 to effect the periodic, automatic action of the last mentioned current switching mechanism at predetermined times of day.

It will be understood that omissions and substitutions for the above designated main groups of parts may be resorted to extensively inside the objectives and accomplishments of the present improvements which are more particularly concerned with the self winding features of the time movement employed and the particular groups of parts here illustrated are chosen to show a useful embodiment of the invention. They will, therefore, be referred to briefly, followed by a more detailed description of the electrical and mechanical parts which govern the self winding action.

Referring to Figs. 1, 2 and 3, the power spring 10 of the band, or spiral, type, operates between a winding wheel 25 and a time wheel 26 on the center arbor 27, being retained for convenience closely adjacent to winding wheel 25 by the drum disc 28 which is rigidly secured to wheel 25 by posts 29, to one of which posts the outer end of spring 10 is anchored,—the inner end being anchored to a pin 30 in arbor 27. The drum structure, comprised of wheel 25, posts 29, disc 28 and its hub 31, turns loosely on the arbor 27 within positive limits prescribed by certain stop parts illustrated in Figs. 4 to 7 inclusive whose function will later be described. The time wheel 26 is fast to arbor 27 and may comprise the slowest moving gear of a time giving train.

Arbor 27 is given a front bearing in the front main frame plate 35 to which a rear main frame plate 36 is secured by posts 37 and the rear plate 36 supports an auxiliary frame plate 38 by means of posts 39 which auxiliary plate affords a rear bearing for the arbor 27. Also supported on the front plate 35 by posts 41 is a clock face 17 hereinafter referred to.

Upon suitable occasions the winding wheel or gear 25 is caused to turn in a clockwise direction as viewed in Fig. 1 (or in a contra clockwise direction as viewed in Figs. 3 to 5, and Figs. 8 to 12) for the purpose of winding the spring 10 whose outer end travels therewith, and is so turned by the intermittent running of an electric motor 11, which for the purposes of this invention may be a self starting motor of either the synchronous, induction, or direct current, types, or any other kind capable of automatically starting when current is supplied to it and of running at either constant or variable speed until its current supply is cut off. Between the motor 11 and winding wheel 25 is a train of simple, speed-reducing gears consisting of the pinion 46 fast to the armature shaft 47 of the electric motor, the gear 48 meshing with same and fast to the spindle 49 as is pinion 50, the gear 51 meshing with pinion 50 and fast to the spindle 52 as is pinion 53, and the gear 54 meshing with pinion 53 and fast to spindle 55 as is pinion 56 which meshes with the winding wheel 25, all of the foregoing spindles having front and rear bearings respectively in the frame plates 35 and 36.

Any form of time train and chronometer escapement may be employed to govern the rotation of the time wheel 26 fixed to arbor 27 so that this arbor may be propelled by spring 10 at a suitable speed for the purpose to be served thereby,—in this application, one revolution in one hour, and arbor 27 will travel in the same direction of rotation that the winding gear 25 revolves for winding the spring 10, as the turning of arbor 27 is in the nature of a follow-up movement with relation to the winding action of wheel 25 for letting off the power stored by the latter in the spring 10. For illustrative purposes I have shown as the chronometer escapement employed the unitary assembly of balance wheel, hair spring, verge, and escape wheel carried by the base 12 screwed to the front face of the frame plate 35 shown in Fig. 1, the escape wheel spindle 60 extending to the rear of plate 35 and there carrying the pinion 61 as shown in Fig. 3. Another spindle 62 carries the gear 63 in mesh with pinion 61 and also fixedly carries the pinion 64. Still another spindle 65 carries the gear 66 in mesh with pinion 64 and also fixedly carries the pinion 67 in mesh with the time wheel 26. The parts just described constitute the time giving train which governs arbor 27 to revolve once in one hour.

In the useful application illustrated, arbor 27 performs the dual functions of driving a conventional minute and hour hand for telling the time of day and of simultaneously impelling a setting dial 80 and associated adjustable trip members 81—82 mounted concentrically therewith. The minute hand 70 is made fast to the extreme forward end of arbor 27. The hour hand 71 has the usual frictional mounting on a sleeve 72 immediately surrounding the arbor 27 and to which is fixed at its rear end the gear 73. In the usual fashion gear 73 is driven by a pinion 74 which, together with an idler gear 75 has a pivotal bearing on the front frame plate 35 and turns in unison with gear 75 which latter is in mesh with the pinion 76 fast to arbor 27, the preferred ratio being a total reduction of one to twelve whereby the hands 70 and 71 sweep the conventional clock face 17 to tell the time of day.

Also deriving its power from pinion 76 fast to arbor 27 is the graduated dial 80 which, together with the setting levers 81 and 82 is frictionally clamped against a shoulder 83 on an outer sleeve 84 by means of the friction washer 85 and the thumb nut 86, sleeve 84 carrying at its rear end the gear 87 whose friction slippage relative to sleeve 84 is permitted by the friction washer 88. The idler gear 89 and the idler pinion 90 have a pivotal bearing on the front frame plate 35 and turn in unison to deliver power from the pinion 76 to the gear 87 and preferably in the ratio of one to twenty-four whereby the dial 80 will rotate in the same direction as the clock hands 70 and 71 at a speed of one revolution in twenty-four hours. These parts are of conventional structure and most clearly shown in Fig. 2.

The function of the adjustable setting levers 81 and 82 is to at predetermined times cause the reciprocatory movement of the trip lever 19, lever 81 carrying the ear 100 and lever 82 carrying the ear 101 for this purpose. Trip lever 19 operates the escapement pawl 102 in unison therewith so that as lever 19 is depressed by the slow passing either of ear 100 or of ear 101 the downwardly extending end of pawl 102 permits one tooth of the switch controlling star wheel 103 to escape, whereupon the star wheel advances a short distance contra-clockwise in Fig. 1 until the tooth of said star wheel which is upwardly disposed in Fig. 1 is intercepted by the end of pawl 102 which extends to the left, it being understood that star wheel 103 is constantly under tension of a spring contained within the ratchet drum 16 (see Fig. 3) which constantly urges the star wheel to rotate contra clockwise in Fig. 1. When either ear 100 or 101 has completely passed the end of the trip lever 19 spring 104 immediately lifts the trip lever 19 into its upper position against tongue 20 on bearing bracket 21 permitting nearly a quarter turn snap action of the star wheel which is checked by the next tooth engaging with the downwardly extending end of pawl 102 ready to repeat the escapement function. Mounted to turn fixedly with star wheel 103 and insulated therefrom as well as from all other metallic parts of the switch rotor is the contact-bridging member, or double-ended blade 105. In the position shown in Fig. 1 this blade conductively bridges a stationary contact clip 106 at the left and a similar contact clip 107 at the right, both clips being mounted in insulated relation to the main frame plate and in electrical connection with suitable binding posts 108 and 109. It will be noted that the clips 106 and 107 have one end elongated to provide for the switch blades 105 continuing to bridge the clips after the preliminary short distance escapement of star wheel 103 referred to above. After the second and full escapement the blade 105 will be vertically disposed in Fig. 1 thus acting at each quarter turn alternately to make and to break the circuit between the binding posts 108 and 109, each making-action and each breaking-action being effected by the travel of each setting lever 81 and 82, respectively, as it engages and finally passes the terminal portion of trip lever 19.

Means for automatically keeping the spring within ratchet barrel 16 sufficiently wound to be ready at all times to effect the escapement of star wheel 103 in the manner described consists in anchoring the outer end of this spring to the drum 16 and the inner end to the switch shaft 110 so that shaft 110 will tend to travel in the same direction that drum 16 is turned which action winds the spring. Referring to Fig. 3 the means for winding the switch spring automatically may further reside in the winding lever 111 pivoted concentrically with shaft 110 and free to reciprocate within limits determined by the heart shaped cam 112 which is fast to spindle 55 at the rear of the frame plate 36, lever 111 being urged constantly upward to rest against cam 112 by the spring 113. Each turn of cam 112 as driven by the winding movement of the electric motor 11, depresses lever 111 which acts through the winding pawl 114 to advance one or more ratchet teeth of the drum 16 under the retaining pawl 115 which holds the wind thus imparted in successive small increments to the drum 16 and thus to the power spring of the switch. Pawl 114 is urged against the ratchet teeth by a spring 116 and pawl 115 is urged against the ratchet teeth by a spring 117, the latter pawl being fixedly pivoted upon any suitable portion of the frame. The auxiliary frame plate 118, mounted on the rear main frame plate 36, gives bearing to the rear end of the switch shaft 110 and convenient room for the ratchet drum 16 at the rear of the main frame plate.

A third binding post for wiring connection appears at 119 in Fig. 1. From the illustrative scheme of wiring connections shown in Fig. 1, the two supply wires marked "Line" are seen to each be connected respectively to binding posts 108 and 119, while the two wires comprising the circuit to be controlled by the switch blade 105 and marked "Load" are connected respectively to the binding posts 109 and 119. The time controlled switch, of which the blades 105 are a part, might be constructed as a double-pole, double-break switch, in which case the flow of current through both of the line and load wires would be interrupted by this switch; but since the drawings show the switch as merely a single-pole, double-break switch, the binding post 119 serves merely as a convenient means of deriving connection to both sides of the line for the wires 120 and 121 carrying current to the electric motor 11. The motor wire 121 runs directly to the winding of the electric motor while the motor wire 120 runs first to the winding control contact 13 and there is the further wire 122 connecting the other contact 14 to the motor winding to complete the circuit to the motor when the contacts 13 and 14 are closed.

This brings us to a description of the features illustrated in Figs. 4 to 12, inclusive, wherein the before mentioned spring-leaf contacts 13, and 14, carried by and in insulated relation to a frame bracket 22, their operating cam 15, winding wheel or gear 25, and arbor 27 are among the parts shown. Figs. 8 to 12 show these parts in various operating positions as they appear when viewed from the rear end of arbor 27 and of actual preferred size corresponding to their scale in Figs. 2 and 3. Figs. 4 to 6 show the parts approximately double in size and viewed in perspective to correspond with the direction in which the parts are viewed in Figure 3.

The winding gear 25 may carry one or both of the two pins 125 and 126 as shown in Figs. 4 and 8 to 11. Close to gear 25, the arbor 27 carries the diametrically disposed pin 127. Close to pin 127, arbor 27 carries the loosely rotatable float arm 128 into whose path of rotation the pins 125 and 126 project. Where both these pins are used, the possible movement of float arm 128 relative to gear 25 is limited by its loose play between these two pins (see Fig. 11). Next to the float arm 128, arbor 27 loosely carries the switch cam 15 comprised of a metallic hub 129, its cam shaped body of insulating material 15 and the stop pin 130 disposed parallel to its axis of rotation. Riveted to the surface of the insulating body 15 and projecting circumferentially therebeyond, so as to comprise a part of the effective periphery of the cam 15 is a conductive piece 131 adapted to conductively bridge contacts 13 and 14 in certain positions and to receive and deliver each of said contacts with a snap action owing to its shape as related to the step shape of the adjacent portions of the cam insulating body 15.

In considering the co-action of these parts, let us first assume that pin 126 is omitted from the gear 25, as it is shown omitted in Figs. 8, 9, and 10. All parts in Figs. 8 to 10 will be understood to revolve contra-clockwise in these three figures, whether the action is one of winding or running down of the clock spring 10, and the winding parts, including the gear 25, pin 125, float arm 128, and cam 15 move only at intervals to effect the winding, the parts 128 and 15 also being movable in the same direction by the pin 127 in arbor 27 during the slow time-keeping, running-down action of spring 10 while the winding gear 25 and its carried pin 125 stand still. It will further be seen that while float arm 128 can pass neither of pins 125 nor 130, these two pins may freely pass each other except for the interference of said float arm as an intermediary, and also that pin 127 in arbor 27 can freely pass the winding pin 125 but will engage and can not pass the cam pin 130. With this understanding of the mechanical relationship, Fig. 8 shows the parts positioned as they are left at the end of an automatic winding action of the electric motor 11. The motor 11 has stopped running for the reason that the spring-leaf contact 14 has just been permitted to drop off the undercut terminus of the conductive piece 131, thus breaking the electrical connection from the line wires to the winding motor 11. Owing to the considerable reduction in the winding train including the pinions or gears 46, 48, 50, 51, 53, 54, 56, 25, the winding gear 25 and its carried pin 125 will remain where it is left at the time the motor 11 stops running immovable in response to any rotative force that can be exerted upon it by the power of spring 10.

The continuous running of the time giving or chronometer train 61, 63, 64, 66, 67, and 26 now permits the slow contra-clockwise rotation of the arbor 27 and consequently of the pin 127. In Fig. 9, the spiral or broken line indicates that this arbor pin 127 has completed one full turn of running down action which brings it to the same position as in Fig. 8, the winding pin 125 meanwhile standing still. However, the arbor pin 127 following an initial idle portion of its said travel has picked up the cam pin 130 and by impelling it has caused cam 15 to rotate less than a complete turn but sufficiently for the leaf contacts 13 and 14 to both be projected onto the conductive piece 131, one at a time and with a snap action as forced upwardly and then passed by the spur 132 of the insulative body 15. Electrical connection is thus established from the line wires to the electric motor 11 which begins to wind at this point. It may be noted that the floater arm has stod still during the running down action from the positions of Fig. 8 to the positions of Fig. 9 for lack of anything to impel or displace it, but that in Fig. 9, the cam pin 130 has rotated so as to come up on the opposite or left side of floater arm 128 with the result that if current had failed, or if the motor 11 did not perform its designed winding action at this point for any other reason, the continued contra-clockwise rotation of pin 127 with the turning of arbor 27 would from this point impel the float arm 128 idly for nearly a second full turn of the arbor 27 to the position of parts shown in Fig. 10 at which time the float arm 128 would bring up against the winding pin 125 and be positively stopped thereby together with all the time keeping parts because of the immovability of pin 127 except through the running of the motor 11 as heretofore explained. But here it will be seen that contact has not been re-established between the leaf contacts 13, 14 because of the failure of the conductive piece 131 to recontact same before the rotation of cam 15 becomes thus positively checked. A condition thus exists where upon resumption of an interrupted current supply through the line wires, the winding motor 11 could not pick up and wind because the contacts 13 and 14 have been automatically left open.

To remedy this undesirable condition, and to provide that at all times the permissible running down of the time movement in the absence of designed periodic winding shall leave the parts ready to automatically pick up and wind and thereafter keep themselves designedly wound, I have provided the second pin 126 whose function will be apparent from Fig. 11. Because pin 126 is fixedly spaced from pin 125 and can turn only when and as pin 125 turns, it is plain from Fig. 11 that if the electric motor should fail to wind at the position of parts shown in Fig. 9, not enough further movement of floater arm 128 could take place, in the continued running down, to deliver the contacts 13 and 14 from off the conductive piece 131 of the cam, this floater arm bringing up against the second pin 126 which like pin 125 is immovable except through the running of the electric motor 11. Contacts 13 and 14 are thus assuredly left closed as all time keeping parts of the movement come to rest, and are ready to pick up and resume automatic winding and normal operation by the mere supplying of current through the line wires. This important function and result might be accomplished by other means such as by varying the arcuate extent of the thickness of the floater arm 128 in relation to the arcuate extent of the conductive piece 131 on cam 15 about the circle of action of these parts, but the preferred means of introducing the second pin 126 here illustrated possesses certain advantages and is to be understood as merely illustrative of the principle of provisions by which this needed result may be accomplished.

Considering now the length of time a self wound clock or time switch of this character can continue running in the absence of the designed periodic automatic winding, due to current failure or other causes, it will be seen that in Figure 10, where only the winding pin 125 is employed, nearly two full turns of arbor 27 constitutes the maximum running capacity under power of spring 10 should the electric motor 11 fail to wind. In point of time, this is something less than two hours duration of running under spring power alone. The addition of the second winding gear pin 126 whose function has been described reduces this spring power maximum running period to only slightly more than one hour. Either of these periods is an undesirably small length of time that a self wound time piece or time switch shall run under spring power alone in the event of the failure of its electric winding mechanism. Fig. 5 accordingly shows a novel expedient which may be resorted to to retain the simplicity and compactness of the self-winding control mechanism heretofore described while increasing to almost any amount the length of time the movement may continue operating under spring power alone without electric winding, within of course, the power limits of the spring which drives the time train. Some initial tension in the power spring 10 must in good practice be always unusable, namely, that tension placed in the spring before the assemblage of the parts shown in Figs. 4 to 7. But the range of spring winding and unwinding above this initial and operatively unused amount up to the full wound condition of the spring may be fully availed of, if desired, by the simple provision of the epicyclic gears of Fig. 5.

In Fig. 5, the pin 125' alone, or supplemented by the pin 126' when desired, for the respective purposes of pins 125 and 126 of the other figures of the drawings, may be carried on a freely rotatable dog arm 135 loosely confined between the arbor pin 127 and the winding gear 25'. Fixedly turning with dog arm 135 is the pinion 136. In mesh with pinion 136 is the epicyclic gear 137 loosely rotatable on the pivot stud 138 carried by winding gear 25'. Pinion 136 may be given one greater or one less number of teeth than gear 137 or any gear ratio may exist between these two epicyclic gears which preferably shall permit these gears to be of somewhat similar diameters while revolving at such relative speeds that a given point on one gear comes into co-incidence with a given point on the other gear only after a plurality of revolutions of the two gears while in mesh. The points of co-incidence may be marked by a pin 139 travelling with pinion 136 and by a pin 140 travelling with gear 137, which two pins project into each other's path thus preventing their attempt to pass at one relative rotative relationship between the pinion and gear and thus locking the pinion and gear against further relative turning with the effect of causing dog arm 135 and winding gear 25' to travel in unison by positive propulsion one by the other in whatever direction the pins 139 and 140 may have effected the locking of the epicyclic train. It will be understood this locking may take place in both directions after the permissible number of turns have taken place whereby pins 139 and 140 retreat from their locking engagement and whereby they again arrive at locking engagement in the opposite direction of relative turning.

The introduction of the epicyclic gears 136 and 137 will be understood to in no way alter the purposes and functions of the parts shown in Figs. 4 to 12 inclusive other than to increase the amount of relative movement between winding gear 25 and the arbor 27 by any desired number of turns additional to this relative movement as permitted by the simple two pins 125, 126 carried directly by gear 25 as shown in Fig. 4. This increased number of relative turns, however, is a measure of the reserve capacity which may be wound into the spring 10 for permitting the clock and the time switch to continue their normal operation for one or more days if desired under the power of spring 10 alone even though no winding of this spring by the electric motor 11 takes place at the designed intervals. Nor does the introduction of gears 136 and 137 preclude the final stopping of the cam 15 in a position to close the contacts 13 and 14 as shown in Fig. 11 whereby upon supply of current to the electric motor 11, no matter to what degree the spring 10 may have become unwound, the winding motor 11 will start to run and will continue its winding action until the free turning of epicyclic gears 136 and 137 has effected the engagement of pins 139 and 140 after which the dog arm 135 will rotate in unison with gear 35' as though locked thereto, the pins 125' and 126' hence acting in the same way and for the same purpose as pins 125, 126 in Fig. 4 heretofore explained.

While Fig. 2 shows the winding wheel 25, spring 10, and time wheel 26 concentric with and carried by the arbor 27, the accomplishment pointed out in these improvements is as possible to an arrangement of the mechanism whereby the parts recited are neither concentric with nor carried by the arbor 27. They may be placed on an entirely separate spindle and the remaining parts including those shown in Figs. 4 to 12 inclusive may remain concentric with and carried by the arbor 27. In such modification gears 25 and 26 might be retained upon the arbor 27 and equivalent gears respectively enmeshed with same carried by the auxiliary spindle for the power spring above referred to.

In the action of the winding and unwinding of the spring 10 by the movements of parts depicted in Figures 8 to 12, inclusive, it may be mentioned that whenever the winding pin 125 or 125' is rotating to effect winding, the shaft 127 is also rotating and in the same direction as pin 125 but at a lower rate of speed as retarded by the time keeping escapement 12. The duration of each running of motor 11 to wind is therefore a function of the relation of these two speeds and also a function of the arcuate extent of the conductive piece 131 carried by the cam 15. By varying these two factors, which would most commonly be done by varying the speed of the winding motor 11 or its gear ratio to the winding gear 25 or 25', or by varying the arcuate extent of the piece 131, the amount of winding that will be imparted to spring 10 at each intermittent running of motor 11 can be determined. It is thus possible to construct the parts so that however far unwound may have become the spring 10 through failure of the motor 11 to wind at its intended time, when motor 11 is again made capable of winding it will at a single run continuously wind the spring 10 until it is fully wound as in normal operation, or it is possible to construct the parts so that however far the unwinding of spring 10 if below the operating range of winding, no single period of running of motor 11 will impart enough winding to compensate for all the winding lost below the normal operating range of winding hereinbefore referred to. In this case the normal operative degree of winding will be reached by successive accumulative runs of the motor 11. For instance, while the shaft pin 127 will be sure to make contact as in Figure 9 each time it completes one revolution and thus start the winding, the winding may continue only long enough to be sure to effect, say, two or more complete revolutions of the gear 25 or 25' before the slow travel of the cam 15 as impelled by the time arbor pin 27 shall act to break the circuit between contacts 13 and 14. This excess of, say, one winding revolution of pin 125 over each corresponding unwinding revolution of pin 127, builds up accumulatively until the normal operating condition and degree of winding is finally resumed.

Our invention will be understood to reside in all major combinations of a completely organized self-winding clock and time switch which are made possible for the first time by the particular features of such organizations herein disclosed and claimed and the following claims contemplate the substitution of equivalents not specifically mentioned herein.

We claim:—

1. Means to limit the rotative movement of a spring winding wheel relative to a spring driven wheel, including in a combination with a spring for storing power, a spring winding wheel connected to one end of said spring and a spring driven wheel connected to the other end of said spring, separable stop means motivated in part by one wheel and in part by the other wheel and engagable for limiting relative movement between said wheels in one direction, and epicyclic gearing connecting a part of said stop means with one of said wheels to augment the number of limited turns of each wheel relative to the other, said gearing including two non-mutilated complete and intermeshed gears respectively carrying stop members adapted to engage only after a plurality of revolutions of each gear.

2. Means to limit the rotative movement of a spring winding wheel relative to a spring driven wheel, including in combination with a spring for storing power, a spring winding wheel connected to impel one end of said spring and a spring driven wheel connected to be impelled by the other end of said spring, inter-engaging stop means moving in part with one of said wheels and moving in part with the other wheel for limiting relative movement between said wheels, and an epicyclic train including two complete unmutilated gears intermeshed and of tooth ratio to permit a number of turns of each of said intermeshed gears before a given point on one gear returns to co-incidence with a given point on the other gear, and means to check the relative movement of said intermeshed gears when the said given points thereon arrive at co-incidence, thereby to lock said train as a factor in limiting the relative movement between said winding and said driven wheels.

3. In a self-winding movement, the combination with a power storing spring, retarding gear connected to be impelled by said spring, and electrically driven gear connected to wind said spring, of circuit controlling means for starting and stopping said winding gear including a floater carrying an arcuate part of conductive material and circuit terminals stationed in circumferentially spaced relation to be conductively bridged by said conductive material in certain rotative positions of said floater, and devices to prevent travel of said floater from said positions until the winding gear winds said spring.

4. In a self-winding movement as described in claim 3 connections whereby the devices which prevent travel of the floater are rotatively associated with said winding gear in a way to permit more than a full turn of said devices relative to said winding gear.

WILLIAM MUIR.
HERBERT C. SNOW.